Feb. 4, 1964  B. I. ULINSKI  3,120,313
LINK TYPE TRUCK
Filed July 25, 1961  2 Sheets-Sheet 1
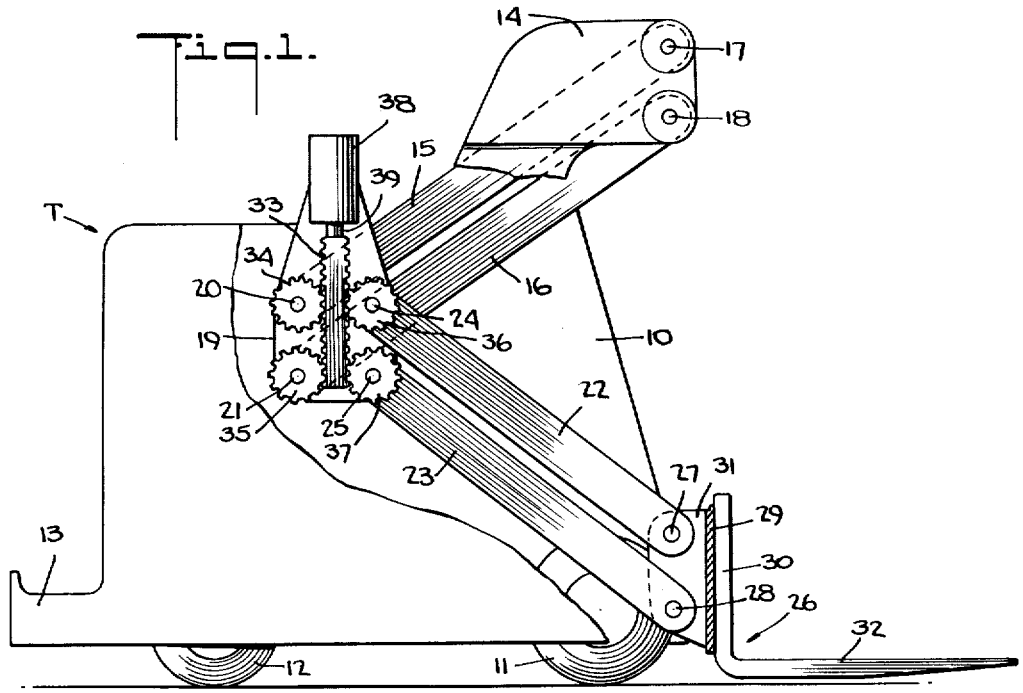
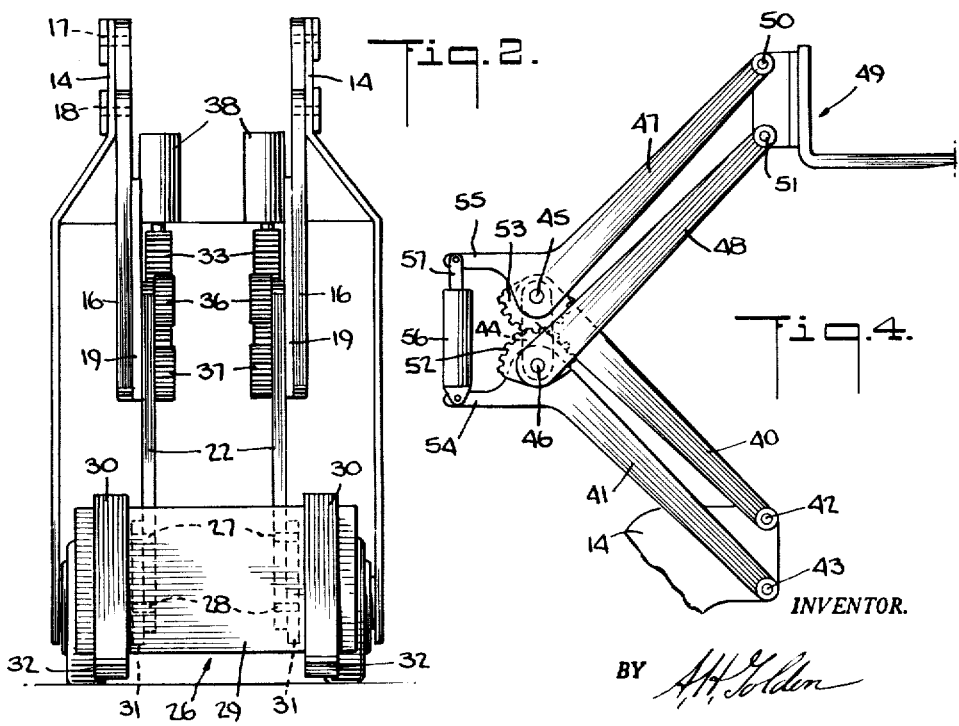
INVENTOR.
BY *A.H. Golden*
ATTORNEY

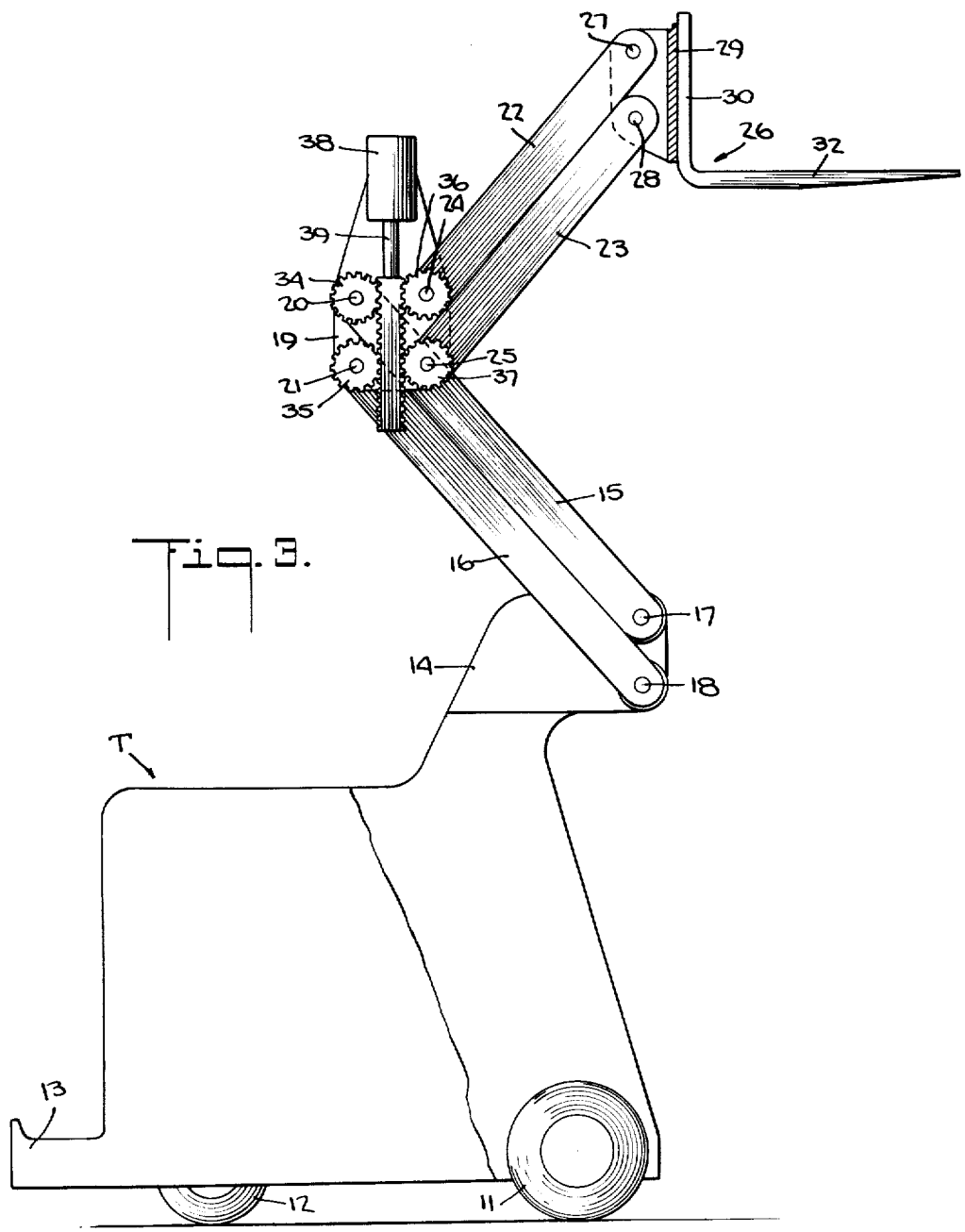

United States Patent Office 3,120,313
Patented Feb. 4, 1964

3,120,313
LINK TYPE TRUCK
Bronislaus I. Ulinski, Flossmoor, Ill., assignor, by mesne assignments, to Yale & Towne, Inc., New York, N.Y., a company of Ohio
Filed July 25, 1961, Ser. No. 126,662
4 Claims. (Cl. 214—131)

This invention relates to a lift truck. More particularly, the invention relates to a lift truck in which the load carriage is mounted for vertical swinging movement relatively to an intermediate link member by means of a pair of forwardly extending parallel arms, and the intermediate link member in turn is mounted for vertical swinging movement relatively to the truck frame by means of a pair of rearwardly extending parallel arms.

With an arrangement of this type, very high lift of the load carriage may be obtained by swinging the rearwardly extending parallel arms vertically upward to raise the intermediate link relatively to the truck frame and at the same time swinging the forwardly extending arms vertically upward to raise the load carriage relatively to the intermediate link.

The purpose of this invention is to provide a simple, compact, relatively inexpensive arrangement for effecting and controlling such swinging movement of the two sets of parallel arms in raising and lowering the load carriage. To this end, the arrangement of the invention includes simple mechanical means, such as gear means, connecting the ends of the two sets of parallel arms carried by the intermediate link, whereby both sets of arms swing simultaneously in opposite directions relatively to the intermediate link when a moving force is applied to either of the sets of arms. By this arrangement, the load carriage may be raised or lowered by either applying a moving force between the two sets of arms or by applying the force between one set of arms and the truck frame. The arrangement of the invention, therefore, permits considerable latitude in the designing of a truck to provide desired operator visibility and overall dimensions to meet particular use requirements of the truck.

As a feature of the invention, a set of the forwardly and rearwardly extending arms are mounted on opposite sides of the truck and the moving force applied between the forwardly and rearwardly extending arms of each set by means of a simple hydraulic ram which is movable bodily with the intermediate link member of each set of arms. By this arrangement, a relatively open space is left between the sets of arms through which the load carriage may be observed by the operator of the truck thereby facilitating the handling of the truck and load. This arrangement also permits the use of relatively short rams for raising and lowering the load carriage thereby further improving operator visibility, as well as minimizing the lateral stresses on the ram.

The invention and its advantages having been broadly described, a more detailed description of two forms of the invention is given hereafter by reference to the accompanying drawings, wherein:

FIG. 1 is a side elevational view, with parts broken away, of a lift truck constructed in accordance with one form of the invention;

FIG. 2 is a front elevational view of the truck shown in FIG. 1;

FIG. 3 is a side elevational view of the truck of FIG. 1, but showing the load carriage in an elevated position, and FIG. 4 is a partial side elevational view of a portion of a lift truck constructed in accordance with a slightly different form of the invention.

Referring to the drawings, and in particular to FIGS. 1–3, one form of the invention is shown applied to a truck T having a main frame 10, front and rear ground engaging wheels 11 and 12, and an operator's platform 13 on which the operator of the truck may stand when operating the truck.

The forward end of the frame 10 is provided with a pair of upstanding portions 14 which are transversely spaced, as best shown in FIG. 2, so that an operator standing on the platform 13 may see between the two portions 14 while operating the truck in handling a load. Each of the portions 14 has a pair of rearwardly extending arms 15 and 16 pivotally secured thereto at their forward ends by means of vertically spaced pivots 17 and 18. The rear ends of the rearwardly extending arms 15 and 16 are pivotally secured to an intermediate link member 19 by means of vertically spaced pivots 20 and 21 which are rigidly secured to the arms 15 and 16, but rotatably mounted on the link member 19, and have the same vertical spacing as the pivots 17 and 18. Each set of arms 15 and 16, together with the upstanding portion 14 and intermediate link member 19 associated therewith, therefore, provides a parallelogram leverage system by which the intermediate link member 19 is supported for vertical swinging movement relatively to the truck frame 10.

A pair of forwardly extending parallel arms 22 and 23 are pivotally secured at their rear ends to each of the intermediate link members 19 on the opposite side thereof from the arms 15 and 16 by vertically spaced pivots 24 and 25 which are rigidly secured to the arms 22 and 23 and rotatably mounted in the link member 19. The forward ends of each of the forwardly extending arms 22 and 23 in turn are secured to a load carriage 26 by means of a pair of vertically spaced pivots 27 and 28 having the same vertical spacing as the pivots 24 and 25. The load carriage 26 includes a back plate 29 which supports a pair of load forks 30, and the arms 22 and 23 are pivotally secured to brackets 31 secured to, or formed integrally with, the back plate 29. The sets of arms 22 and 23, together with the intermediate link member 19 and the bracket 31 associated therewith, form a parallelogram leverage system which supports the back plate 29 and load forks 30 for vertical swinging movement relatively to the intermediate link member 19, while maintaining the load supporting surface 32 of the load forks 30 in a substantially horizontal plane. By this arrangement of forwardly and rearwardly extending arms, relatively high lift of the forks 30 may be obtained by swinging the rearwardly extending parallel arms 15 and 16 vertically upward to raise the intermediate link members 19 relatively to the truck frame 10, and at the same time swinging the forwardly extending arms 22 and 23 vertically upward relatively to the intermediate link member 19, as shown in FIG. 3.

In the form of the invention as illustrated in FIGS. 1–3, simultaneous swinging movement of both sets of arms 15, 16 and 22, 23 in raising and lowering the load carriage 26 is effected and controlled through simple gear means including a rack 33 which meshes with separate pinions 34, 35, 36 and 37 which are secured to the pivots 20, 21, 24 and 25 of the arms 15, 16, 22 and 23, and are rotatable with the arms relatively to the link member 19. By this gear arrangement, both sets of arms 15, 16 and 22, 23 are connected together and must swing simultaneously in opposite directions relatively to the intermediate link member 19 when a moving force is applied to either set of arms.

Such a moving force is applied to each set of arms through the rack 33 by means of a hydraulic ram 38 which is secured to each intermediate link member 19 and has a piston rod 39 which is secured to the rack 33. When the ram 38 is operated to extend the piston rod 39 so as to move the rack 33 secured thereto downwardly, the rearwardly extending arms 15 and 16 swing vertically upwardly relatively to the truck frame by reason of the driving engagement of the rack 33 with pinions 34 and 35, and the forwardly extending arms 22 and 23 swing upwardly relatively to the intermediate link member 19 by reason of the driving engagement of the rack 33 with pinions 36 and 37, so that the load carriage is elevated to the position shown in FIG. 3. The path of movement of the load carriage 26 is determined by the relative lengths of the arms 15, 16 and 22, 23 and it will be appreciated that by proper selection of the length of the arms, various paths of movement including a substantially vertical straight line path of movement may be obtained. The load carriage 26 is held in the elevated position so long as fluid pressure is maintained on the hydraulic ram 38 to hold the piston rod 39 extended. The rams 38, of course, can also be operated to position the load carriage 26 in any intermediate position between the position shown in FIG. 1 and the position shown in FIG. 3. As best shown in FIG. 2, this arrangement of the rams 38 provides very little obstruction to the view of the operator of the truck. This arrangement also allows relatively short rams to be used which further improves operator visibility, as well as minimizes the lateral stresses imposed on the rams.

Referring now to FIG. 4, there is shown a slightly different form of the invention. In this form of the invention, rearwardly extending parallel arms 40 and 41 are pivotally secured at their forward ends to upstanding portions 14 of the truck by means of pivots 42 and 43, and are pivotally secured at their rear ends to an intermediate link 44 by vertically spaced pivots 45 and 46 having the same vertical spacing as the pivots 42 and 43. A pair of forwardly extending parallel arms 47 and 48 are pivotally secured at their rear ends to the intermediate link 44 by the same pivots 45 and 46, and are pivotally secured at their forward ends to a load carriage 49 by vertically spaced pivots 50 and 51 having the same vertical spacing as the pivots 45 and 46.

The arm 41 of the rearwardly extending arms is provided with a gear segment 52 secured to, or formed as an integral part of, the rear end of the arm and having its center at the pivot 46. The gear segment 52 in turn meshes with a similar gear segment 53 secured to, or formed as an integral part of, the rear end of the forwardly extending arm 47 and having its center at the pivot 45. By this arrangement, the two sets of arms 40, 41 and 47, 48 are connected together so that they must move simultaneously in opposite directions relatively to the intermediate link 44 when a moving force is applied to either of the sets of arms.

In the form of the invention as illustrated in FIG. 4, the moving force is applied between an extension 54 of the arm 41 and an extension 55 of the arm 47 by means of a ram 56. The ram 56 is pivotally secured to the extension 54 and has a piston rod 57 which is pivotally secured to the extension 55. When a piston rod 57 is retracted, as shown in FIG. 4, both sets of arms 40, 41 and 47, 48 swing upwardly to elevate the load carriage 49 because of the gear connection between the sets of arms provided by the meshing gear segments 52 and 53. If the piston rod 57 is extended, the arms will swing vertically downwardly to lower the load carriage 49. As shown in FIG. 4, the arms 40 and 41 are of the same length, and the gear segments 52 and 53 are of the same size so that the load carriage 49 must move in a straight line path during raising and lowering. While only one set of the arms 40, 41, 47 and 48 is shown in FIG. 4, it will be appreciated that another set of the arms is provided on the opposite side of the truck, as in the arrangement of FIGS. 1–3.

From the preceding description, it can be seen that there is provided a very simple, inexpensive arrangement for effecting and controlling the vertical swinging movement of the two sets of arms to effect lifting and lowering of the load carriage of a lift truck. In the two forms of the invention as illustrated, the moving force is applied by a ram supported by and movable bodily with the arms, with the ram acting between the rearwardly and forwardly extending arms and the gear means controlling the movement of the arms so that both move simultaneously. With this arrangement, the rams may be relatively short so as to minimize the lateral stresses imposed thereon, and also improve operator visibility.

While two forms of the invention have been shown and described, it will be appreciated that this is for the purpose of illustration and that changes and modifications can be made therein without departing from the spirit and scope of the invention.

I now claim:

1. In combination with a truck having a frame and ground engaging wheels secured to said frame for supporting said frame, upstanding means adjacent one end of said frame, an intermediate link member, a pair of rearwardly extending arms pivotally secured at their forward ends to said upstanding means at vertically spaced points and pivotally secured at their rearward ends to said intermediate link member at vertically spaced points to form a first parallelogram leverage system for supporting said intermediate link member for swinging vertical movement relatively to said frame, said arms assuming a position extending angularly downwardly relatively to said upstanding means when said intermediate link member is in a lowered position and extending angularly upwardly relatively to said upstanding means when said intermediate link member is in a raised position, a load carriage, a pair of forwardly extending arms pivotally secured at their rear ends to said intermediate link member at vertically spaced points and pivotally secured at their forward ends to said load carriage at vertically spaced points to form a second parallelogram leverage system for supporting said load carriage for swinging vertical movement relatively to said intermediate link member, said forwardly extending arms extending angularly downwardly from said intermediate link member when said intermediate link member is in said lowered position and being of such length as to position said load carriage adjacent the ground forwardly of said upstanding member, said forwardly extending arms extending angularly upwardly relatively to said intermediate link member when said intermediate link member is in a raised position, said forwardly extending arms having lateral clearance with said rearwardly extending arms whereby said forwardly extending arms may move vertically past said rearwardly extending arms, mechanical motion transmitting means connecting the rear end of at least one arm of said pair of rearwardly extending arms to the rear end of at least one arm of said pair of forwardly extending arms for causing simultaneous vertical swinging movement of both pairs of arms in opposite directions relatively to said intermediate link member when a moving force is applied to at least one pair of said arms, and means for applying a moving force to at least one pair of said arms to effect said simultaneous vertical swinging movement of both pairs of arms to elevate and lower said load carriage.

2. In combination with a truck having a frame and ground engaging wheels secured to said frame for supporting said frame, upstanding means adjacent one end of said frame, an intermediate link member, a pair of rearwardly extending arms pivotally secured at their forward ends to said upstanding means at vertically spaced points and pivotally secured at their rearward ends to said intermediate link member at vertically spaced points to form a first parallelogram leverage system for supporting said intermediate link member for swinging vertical movement relatively to said frame, said arms assuming a position extending angularly downwardly relatively to said upstanding means when said intermediate link member is in a lowered position and extending angularly upwardly relatively to said upstanding means when said intermediate link member is in a raised position, a load carriage, a pair of forwardly extending arms pivotally secured at their rear ends to said intermediate link member at vertically spaced points and pivotally secured at their forward ends to said load carriage at vertically spaced points to form a second parallelogram leverage system for supporting said load carriage for swinging vertical movement relatively to said intermediate link member, said forwardly extending arms extending angularly downwardly from said intermediate link member when said intermediate link member is in said lowered position and being of such length as to position said load carriage adjacent the ground forwardly of said upstanding member, said forwardly extending arms extending angularly upwardly relatively to said intermediate link member when said intermediate link member is in a raised position, said forwardly extending arms having lateral clearance with said rearwardly extending arms whereby said forwardly extending arms may move vertically past said rearwardly extending arms, gear means connecting the rear end of at least one arm of said pair of rearwardly extending arms to the rear end of at least one arm of said pair of forwardly extending arms for causing simultaneous vertical swinging movement of both pairs of arms in opposite directions relatively to said intermediate link member when a moving force is applied to at least one pair of said arms, and means for applying a moving force to at least one pair of said arms to effect said simultaneous vertical swinging movement of both pair of arms to elevate and lower said load carriage.

3. In combination with a truck having a frame and ground engaging wheels secured to said frame for supporting said frame, upstanding means adjacent one end of said frame, an intermediate link member, a pair of rearwardly extending arms pivotally secured at their forward ends to said upstanding means at vertically spaced points and pivotally secured at their rearward ends to said intermediate link member at vertically spaced points to form a first parallelogram leverage system for supporting said intermediate link member for swinging vertical movement relatively to said frame, said arms assuming a position extending angularly downwardly relatively to said upstanding means when said intermediate link member is in a lowered position and extending angularly upwardly relatively to said upstanding means when said intermediate link member is in a raised position, a load carriage, a pair of forwardly extending arms pivotally secured at their rear ends to said intermediate link member at vertically spaced points and pivotally secured at their forward ends to said load carriage at vertically spaced points to form a second parallelogram leverage system for supporting said load carriage for swinging vertical movement relatively to said intermediate link member, said forwardly extending arms extending angularly forwardly from said intermediate link member when said intermediate link member is in said lowered position and being of such length as to position said load carriage adjacent the ground forwardly of said upstanding member, said forwardly extending arms extending angularly upwardly relatively to said intermediate link member when said intermediate link member is in a raised position, said forwardly extending arms having lateral clearance with said rearwardly extending arms whereby said forwardly extending arms may move vertically past said rearwardly extending arms, a pinion secured to the rear end of at least one arm of each pair of arms, a rack meshing with said pinions whereby movement of said rack causes simultaneous vertical movement of said pairs of arms in opposite directions relatively to said intermediate link member, and power means carried by said intermediate link member for moving said rack to effect said simultaneous vertical swinging movement of said pair of arms to elevate or lower said load carriage.

4. In combination with a truck having a frame and ground engaging wheels secured to said frame for supporting said frame, upstanding means adjacent one end of said frame, an intermediate link member, a pair of rearwardly extending arms pivotally secured at their forward ends to said upstanding means at vertically spaced points and pivotally secured at their rearward ends to said intermediate link member at vertically spaced points to form a first parallelogram leverage system for supporting said intermediate link member for swinging vertical movement relatively to said frame, said arms assuming a position extending angularly downwardly relatively to said upstanding means when said intermediate link member is in a lowered position and extending angularly upwardly relatively to said upstanding means when said intermediate link member is in a raised position, a load carriage, a pair of forwardly extending arms pivotally secured at their rear ends to said intermediate link member at vertically spaced points and pivotally secured at their forward ends to said load carriage at vertically spaced points to form a second parallelogram leverage system for supporting said load carriage for swinging vertical movement relatively to said intermediate link member, said forwardly extending arms extending angularly downwardly from said intermediate link member when said intermediate link member is in said lowered position and being of such length as to position said load carriage adjacent the ground forwardly of said upstanding member, said forwardly extending arms extending angularly upwardly relatively to said intermediate link member when said intermediate link member is in a raised position, said forwardly extending arms having lateral clearance with said rearwardly extending arms whereby said forwardly extending arms may move vertically past said rearwardly extending arms, a gear on the rear end of one arm of said pair of rearwardly extending arms meshing with a gear on the rear end of one arm of said forwardly extending pair of arms for causing simultaneous vertical swinging movement of both said pairs of arms in opposite directions relatively to said intermediate link member when a moving force is applied to one of said pairs of arms, an extension on the rear end of one arm of each of said pairs of arms, and power means secured to and extending between said extensions for applying a moving force to effect simultaneous vertical swinging movement of said pairs of arms to elevate and lower said load carriage.

References Cited in the file of this patent
UNITED STATES PATENTS

| | | |
|---|---|---|
| 521,256 | Browne | June 12, 1894 |
| 2,500,815 | Gerli et al. | Mar. 14, 1950 |
| 2,672,249 | Ulinski | Mar. 16, 1954 |
| 2,852,149 | Bruneri | Sept. 16, 1958 |